(12) United States Patent
Kinoshita

(10) Patent No.: US 9,745,945 B2
(45) Date of Patent: Aug. 29, 2017

(54) ENGINE SYSTEM FOR VESSEL PROPULSION DEVICE AND VESSEL INCLUDING THE SAME

(71) Applicant: YAMAHA HATSUDOKI KABUSHIKI KAISHA, Iwata-shi, Shizuoka (JP)

(72) Inventor: Yoshimasa Kinoshita, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 302 days.

(21) Appl. No.: 14/452,631

(22) Filed: Aug. 6, 2014

(65) Prior Publication Data
US 2015/0040866 A1 Feb. 12, 2015

(30) Foreign Application Priority Data

Aug. 8, 2013 (JP) .................. 2013-165390

(51) Int. Cl.
*F02P 5/152* (2006.01)
*F02D 35/02* (2006.01)
(Continued)

(52) U.S. Cl.
CPC .............. *F02P 5/152* (2013.01); *F02D 9/02* (2013.01); *F02D 11/107* (2013.01); *F02D 35/027* (2013.01); *F02D 37/02* (2013.01); *F02D 41/0002* (2013.01); *F02D 41/22* (2013.01); *F02D 31/002* (2013.01); *F02D 2011/102* (2013.01); *F02D 2041/227* (2013.01); *F02D 2250/26* (2013.01); *F02P 3/02* (2013.01); *F02P 5/045* (2013.01); *F02P 5/1526* (2013.01); *F02P 11/00* (2013.01); *F02P 17/00* (2013.01); *G01L 23/22* (2013.01); *Y02T 10/42* (2013.01); *Y02T 10/46* (2013.01)

(58) Field of Classification Search
CPC . F02P 5/152; F02P 5/00; F02D 35/027; F02D 37/02; F02D 41/0002
See application file for complete search history.

(56) References Cited

U.S. PATENT DOCUMENTS 5,165,378 A * 11/1992 Miyashita ............... F02P 5/152
  123/406.35
6,971,360 B2 * 12/2005 Katayama ............. F02B 61/045
  123/192.1
(Continued)

*Primary Examiner* — Hung Q Nguyen
*Assistant Examiner* — Xiao Mo
(74) *Attorney, Agent, or Firm* — Keating and Bennett, LLP

(57) ABSTRACT

An engine system for a vessel propulsion device includes an engine including an intake amount adjusting unit and an ignition plug, and configured to generate a drive force for the vessel propulsion device. The engine system includes an ignition timing control unit, a knocking detecting unit, a knocking retard control unit that retards the ignition timing of the ignition plug by a unit retard amount when the knocking detecting unit detects knocking, an abnormality judging unit that, when a state where the knocking detecting unit detects knocking at intervals within a predetermined time continues, judges that an abnormality has occurred based on a continued state of knocking detection, and an intake amount limiting unit that limits the intake amount of the engine based on judgment of an abnormality made by the abnormality judging unit.

10 Claims, 9 Drawing Sheets

(51) Int. Cl.
*F02D 37/02* (2006.01)
*F02D 41/00* (2006.01)
*F02D 9/02* (2006.01)
*F02D 41/22* (2006.01)
F02P 3/02 (2006.01)
F02P 5/04 (2006.01)
F02P 11/00 (2006.01)
F02P 17/00 (2006.01)
F02D 31/00 (2006.01)
G01L 23/22 (2006.01)
F02D 11/10 (2006.01)

(56) References Cited

U.S. PATENT DOCUMENTS

| | | | |
|---|---|---|---|
| 2004/0099237 A1 | 5/2004 | Katayama | |
| 2006/0081215 A1 | 4/2006 | Kinoshita | |
| 2009/0143958 A1* | 6/2009 | Parker | F02D 41/3836 |
| | | | 701/104 |
| 2011/0093186 A1* | 4/2011 | Hagari | F02D 13/0226 |
| | | | 701/111 |

* cited by examiner

ENGINE SYSTEM FOR VESSEL PROPULSION DEVICE AND VESSEL INCLUDING THE SAME

BACKGROUND OF THE INVENTION

1. Field of the Invention

The present invention relates to an engine system for a vessel propulsion device using an engine (internal combustion engine) as a drive source, and a vessel including such an engine system.

2. Description of the Related Art

US 2004/0099237A1 discloses a knocking avoidance control system for a four-stroke engine of an outboard motor. This system includes a knocking sensor that detects an occurrence of knocking of an engine. When the knocking sensor detects knocking, an ignition timing is retarded so as to suppress knocking to a low level. Further, when knocking is suppressed to a predetermined low level, intake air is reduced to keep the low knocking level. By retarding the ignition timing, knocking is suppressed in a short time, and then, by reducing the intake amount, knocking can be suppressed while avoiding deterioration of fuel efficiency.

SUMMARY OF THE INVENTION

The inventor of preferred embodiments of the present invention described and claimed in the present application conducted an extensive study and research regarding an engine system for a vessel propulsion device, such as the one described above, and in doing so, discovered and first recognized new unique challenges and previously unrecognized possibilities for improvements as described in greater detail below.

When knocking is caused by an abnormality in the engine, the knocking level may not be reduced to the low level by retarding the ignition timing. For example, there is a case where a fuel having an octane number lower than that of a designated fuel is used. In this case, with the prior art disclosed in US 2004/0099237A1, the knocking level cannot be reduced to the low level by retard control, and a transition to knocking suppressing control by reducing the intake amount may not be performed. Therefore, with the prior art disclosed in US2004/0099237A1, when an abnormality occurs in the engine, knocking suppression control by limiting the intake amount may not be performed.

Particularly, an engine to be used as a drive source of a vessel propulsion device is often operated at a maximum output point, so that in many cases, a standard ignition timing is set to a retard side with respect to MBT (Minimum advance for Best Torque) and knocking suppression at the maximum output is performed. Therefore, the retard control margin is small, so that when an abnormality occurs in the engine, it is more likely that knocking cannot be sufficiently reduced.

A preferred embodiment of the present invention provides an engine system for a vessel propulsion device that reliably judges the occurrence of an abnormality and starts limiting an intake amount, and a vessel including such an engine system.

A preferred embodiment of the present invention provides an engine system for a vessel propulsion device including an engine that includes an intake amount adjusting unit that adjusts an intake amount to be sucked into a cylinder and an ignition plug that ignites a gas mixture inside the cylinder, and generates a drive force for the vessel propulsion device to generate a thrust of a vessel. This engine system for a vessel propulsion device includes an ignition timing control unit that controls an ignition timing of the ignition plug, a knocking detecting unit that detects knocking in the engine, a knocking retard control unit that causes the ignition timing control unit to retard the ignition timing of the ignition plug by a unit retard amount when the knocking detecting unit detects knocking, an abnormality judging unit that, when a state in which the knocking detecting unit detects knocking at intervals within a predetermined time continues, judges that an abnormality has occurred based on a continued state of knocking detection, and an intake amount limiting unit that limits the intake amount of the engine by controlling the intake amount adjusting unit based on judgment of an abnormality made by the abnormality judging unit.

With this arrangement, when knocking is detected, the ignition timing of the ignition plug is retarded by the unit retard amount, and accordingly, knocking is reduced or prevented. On the other hand, when the occurrence frequency of knocking is high and the state where knocking is detected at intervals within the predetermined time continues, based on the continued state, it is judged that an abnormality has occurred. Based on this judgment of an abnormality, the intake amount adjusting unit is controlled to limit the intake amount of the engine. Accordingly, the engine output is limited, so that knocking is reduced or prevented. Accordingly, an occurrence of an abnormality is judged based on the continued state of knocking detection at intervals within the predetermined time, so that even if the knocking level cannot be reduced to a low level by retard control, an occurrence of an abnormality is reliably judged. Therefore, when an abnormality occurs, knocking control by limiting the intake amount is reliably started. Accordingly, damage to the engine due to knocking is reduced.

An example of an abnormality is an abnormality in which knocking cannot be sufficiently reduced or prevented by retarding the ignition timing. Still another example of an abnormality is a case where a fuel having an octane number lower than that of a designated fuel is used.

According to a preferred embodiment of the present invention, the intake amount limiting unit continues limiting the intake amount of the engine until the engine is stopped after starting limiting the intake amount of the engine based on judgment of an abnormality made by the abnormality judging unit.

With this arrangement, once the limited intake amount has been started based on judgment of an abnormality, this limited intake amount is continued until the engine stops. In other words, the limited intake amount is canceled in response to the engine stopping. Therefore, even when the frequency of knocking is reduced by the limited intake amount, the limited intake amount is not canceled. According to the prior art disclosed in US 2004/0099237A1, when the limited intake amount is performed and knocking is eliminated, the limited intake amount is canceled. Therefore, when an abnormality occurs in the engine, even if the knocking level is reduced to a low level by retard control and the limited intake amount is started, when knocking is eliminated, the limited intake amount is canceled. Therefore, although an abnormality has occurred, the operation state restores to a normal operation state and leads to a state where knocking frequently occurs again. This repetition damages the engine, and lowers a cruising feeling due to frequent changes in engine output. Therefore, according to a preferred embodiment of the present invention, once the limited intake amount has been started based on judgment of an abnormality, the limited intake amount is continued until the engine stops. Accordingly, damage to the engine is reduced, and the cruising feeling when an abnormality occurs is improved.

According to a preferred embodiment of the present invention, a normal ignition timing is set to a retard side with respect to the MBT (Minimum advance for Best Torque).

The engine to be used as a drive source of a vessel propulsion device is often operated at a maximum output point. Therefore, by setting the normal ignition timing to the retard side with respect to the MBT, without requiring retard control, the engine is operated while reducing or preventing knocking. On the other hand, the retard control margin is small, so that when an abnormality occurs in the engine, knocking reduction or prevention by retard control may become insufficient. Therefore, by starting the limited intake amount based on judgment of an abnormality, switching to knocking control by the limited intake amount is performed when an abnormality occurs. Accordingly, in both of a normal state and an abnormal state, knocking is reliably reduced or prevented and damage to the engine is reduced or prevented.

According to a preferred embodiment of the present invention, the intake amount limiting unit does not perform limiting of the intake amount until the abnormality judging unit judges an abnormality even if the knocking detecting unit detects knocking.

With this arrangement, until an abnormality is judged, limiting of the intake amount is not performed. Therefore, until an abnormality is judged, knocking is reduced or prevented exclusively by retard control. Accordingly, as long as no abnormality occurs, the engine output does not repeatedly fluctuate according to the limited intake amount, so that knocking is reduced or prevented without greatly lowering the cruising feeling.

According to a preferred embodiment of the present invention, the abnormality judging unit includes an integrated value operating unit that calculates an integrated value that increases each time the knocking detecting unit detects knocking, and is initialized when the knocking detecting unit detects no knocking for the predetermined time, and an integrated value comparing unit that compares the integrated value operated by the integrated value operating unit with a predetermined integrated value threshold, and judges that an abnormality has occurred when the integrated value exceeds the integrated value threshold.

With this arrangement, the integrated value calculated by the integrated value operating unit is increased when knocking is detected at intervals within the predetermined time, and is initialized when an elapsed time from a previous knocking detection exceeds the predetermined time. When an abnormality occurs, knocking is repeatedly detected at intervals within the predetermined time, and the integrated value increases monotonically and reaches the predetermined integrated value threshold. Accordingly, an occurrence of an abnormality is judged. An occurrence of an abnormality is thus reliably judged, and based on this reliable judgment, the limited intake amount is started.

The integrated value may be increased by a predetermined unit amount each time knocking is detected. This unit amount may be the unit retard amount, or may be a fixed amount different from the unit retard amount.

According to a preferred embodiment of the present invention, the integrated value operating unit increases the integrated value based on a condition that a knocking retard amount being a retard amount applied by the knocking retard control unit exceeds a predetermined retard amount threshold.

With this arrangement, when a condition that the knocking retard amount exceeds the predetermined retard amount threshold occurs, the integrated value is increased. Accordingly, the state in which knocking frequently occurs despite retard control exceeding the retard amount threshold is detected. This enables a more reliable judgment of an abnormality.

According to a preferred embodiment of the present invention, the integrated value operating unit increases the integrated value in increments of the unit retard amount. With this arrangement, the integrated value is increased in increments of the unit retard amount, so that the integrated value becomes a value directly relating to the retard amount, and is an exact index relating to a possibility of occurrence of an abnormality. Therefore, more reliable judgment of an abnormality using the integrated value is made.

According to a preferred embodiment of the present invention, the abnormality judging unit judges that an abnormality has occurred based on a condition that a knocking retard amount corresponding to a retard amount applied by the knocking retard control unit reaches a knocking retard amount upper limit. With this arrangement, when the knocking retard amount reaches the knocking retard amount upper limit and the retard control reaches a limit, an abnormality is judged. Accordingly, judgment of an abnormality is more reliably made, and a transition to an intake amount limiting control based on judgment of an abnormality is properly made.

According to a preferred embodiment of the present invention, the knocking retard control unit periodically checks the output of the knocking detecting unit with a predetermined detection period, and in each detection period, when the knocking detecting unit detects knocking, the knocking retard control unit retards the ignition timing by the unit retard amount, and on the other hand, when the knocking detecting unit detects no knocking, the knocking retard control unit advances the ignition timing by a unit advance amount.

With this arrangement, the output of the knocking detecting unit is monitored in each detection period, and when knocking occurs, the ignition timing is retarded by the unit retard amount, and when knocking does not occur, the ignition timing is advanced by the unit advance amount. Accordingly, the ignition timing is controlled to a proper ignition timing. When an abnormality occurs, knocking occurs even if the ignition timing is repeatedly retarded by each unit retard amount, and in this case, it is judged that an abnormality has occurred, and switching to knocking control by limiting the intake amount is performed.

A preferred embodiment of the present invention provides a vessel including a vessel body, a vessel propulsion device attached to the vessel body, and the engine system for a vessel propulsion device that includes the engine provided in the vessel propulsion device and includes the above-described features. With this arrangement, the vessel including the engine system for a vessel propulsion device that reliably judges an occurrence of an abnormality and starts limiting the intake amount is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
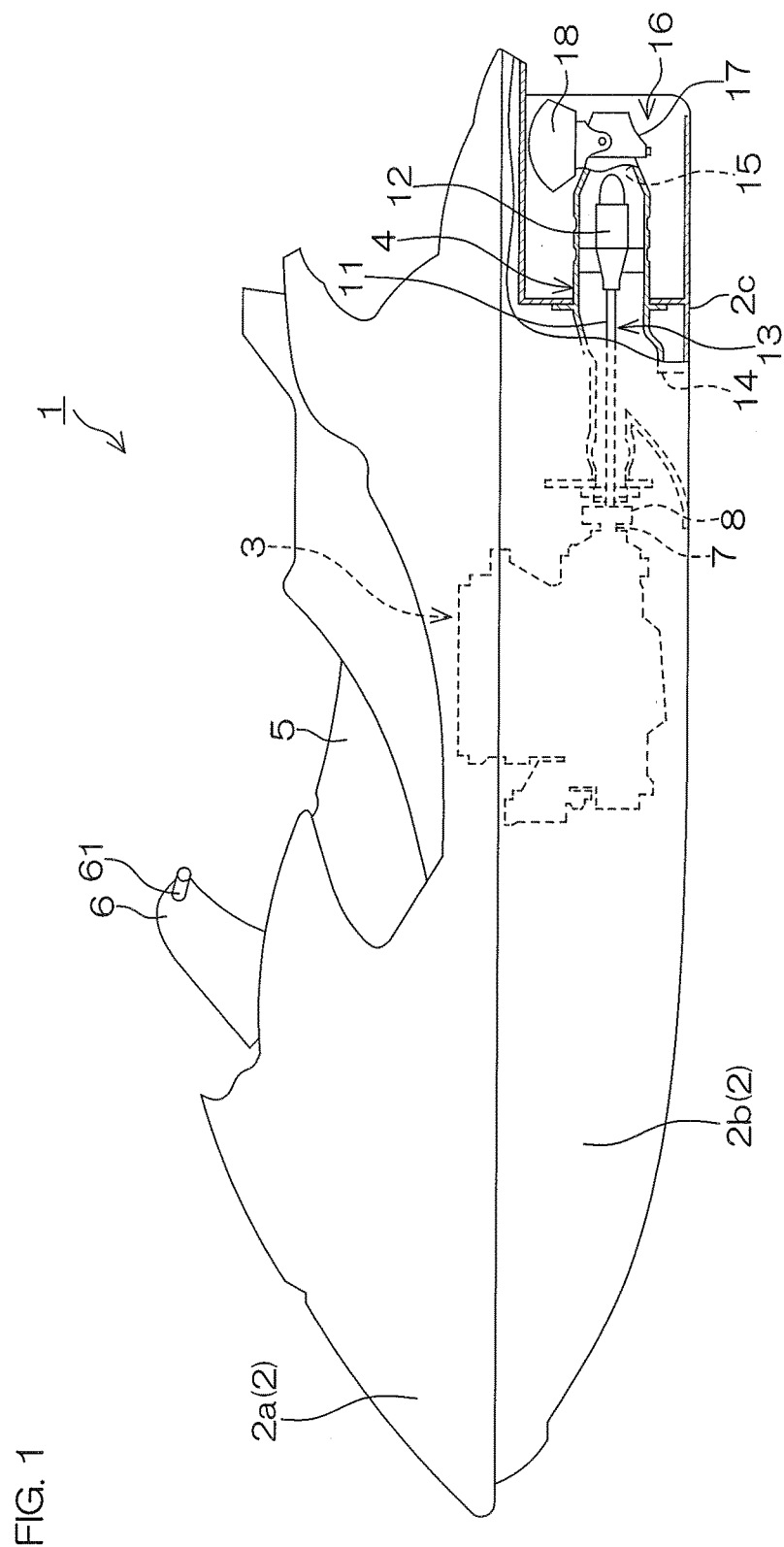
FIG. 1 is a side view for describing an arrangement of a water jet propulsion watercraft according to a preferred embodiment of a vessel of the present invention.

FIG. 1 is a side view for describing an arrangement of a water jet propulsion watercraft according to a preferred embodiment of a vessel of the present invention. The water jet propulsion watercraft 1 includes a vessel body 2, an engine 3, and a jet propulsion device (water jet pump) 4. The vessel body 2 includes a deck 2a and a hull 2b. A seat 5 that an occupant straddles and is seated on is provided on the upper surface extending rearward from the central portion of the deck 2a. A steering device 6 to steer the water jet propulsion watercraft 1 is arranged ahead of the seat 5. The engine 3 is an internal combustion engine, and is housed in an engine room inside the vessel body 2 and mounted on the vessel body 2. The jet propulsion device 4 is driven by a drive force of the engine 3, and applies thrust to the vessel body 2 by suctioning surrounding water and ejecting the water.

A crankshaft 7 of the engine 3 is arranged along a front-rear direction of the vessel body 2. A drive shaft 11 of the jet propulsion device 4 is joined to the rear end portion of the crankshaft 7 by a coupling member 8. The drive shaft 11 is arranged along the front-rear direction of the vessel body 2. The jet propulsion device 4 includes the drive shaft 11 and an impeller 12. The impeller 12 is attached to the rear portion of the drive shaft 11. The impeller 12 is fixed to the drive shaft 11, and rotates together with the drive shaft 11.

A water passage portion 13 is defined on a lower portion of the vessel body 2. The water passage portion 13 defines a water flow channel between a water flowing-in portion 14 on the vessel bottom 2c and a water discharge portion (nozzle) 15 that opens rearward. The impeller 12 is arranged inside the water passage portion 13. When the impeller 12 rotates, water surrounding the vessel body 2 is pumped from the water flowing-in portion 14 and flows into the water passage portion 13. The flowing-in water is fed to the water discharge portion 15 by the rotation of the impeller 12, and jetted out rearward from the water discharge portion 15. The water discharge portion 15 is arranged in a pump chamber 16 defined on the rear portion of the hull 2b.

A deflector 17 to divert the water jet direction into the left-right direction is attached to the water discharge portion 15. The deflector 17 is a tubular member attached turnably in the left-right direction with respect to the water discharge portion 15. The deflector 17 turns to the left and right according to an operation of the steering device 6, and accordingly diverts the direction of the water to be jetted out from the water discharge portion 15. Accordingly, due to the reaction force of the jetted water, the direction of the thrust to be applied to the vessel body 2 is changed to the left and right with respect to the vessel body 2, and therefore, the water jet propulsion watercraft 1 is steered.

The steering device 6 includes an operation member that is operated to turn to the left and right. The operation member is a handle bar 61 extending in the left-right direction of the vessel body 2 in the present preferred embodiment. When the handle bar 61 is turned, this turning operation force is mechanically transmitted to the deflector 17. In detail, the operation force of the handle bar 61 is preferably transmitted to the deflector 17 by a Bowden cable or the like. Of course, it is also possible that a steering angle sensor that detects a turning angle of the handle bar 61 is provided, and by an electric or hydraulic actuator that is controlled according to an output signal of the steering angle sensor, the deflector 17 is turned to the left and right.

Further, a reverse bucket 18 is attached to the water discharge portion 15 so as to turn in the up-down direction. The reverse bucket 18 is turnable in the up-down direction between a reverse drive position at which the reverse bucket 18 covers the deflector 17 from the rear side and a forward drive position (position shown in FIG. 1) at which the reverse bucket 18 withdraws upward to open the rear side of the deflector 17. When the reverse bucket 18 is at the forward drive position, the water flow jetted out from the deflector 17 is jetted rearward according to the direction of the deflector 17. When the reverse bucket 18 is at the reverse drive position, the water flow jetted out from the deflector 17 is reversed to the lower front side by the reverse bucket 18. Accordingly, thrust to make the vessel body 2 travel backward is generated.

The reverse bucket 18 is located at the forward drive position or the reverse drive position by operating a forward-reverse drive selecting operation portion 64 (see FIG. 2) provided on the steering device 6. For example, the reverse bucket 18 may be actuated by an electric or hydraulic actuator that is controlled in response to an operation of the forward-reverse drive selecting operation portion 64. In addition, an arrangement may be used in which the operation of the forward-reverse drive selecting operation portion 64 is mechanically transmitted to the reverse bucket 18 by a Bowden cable, etc.

Figure 2:
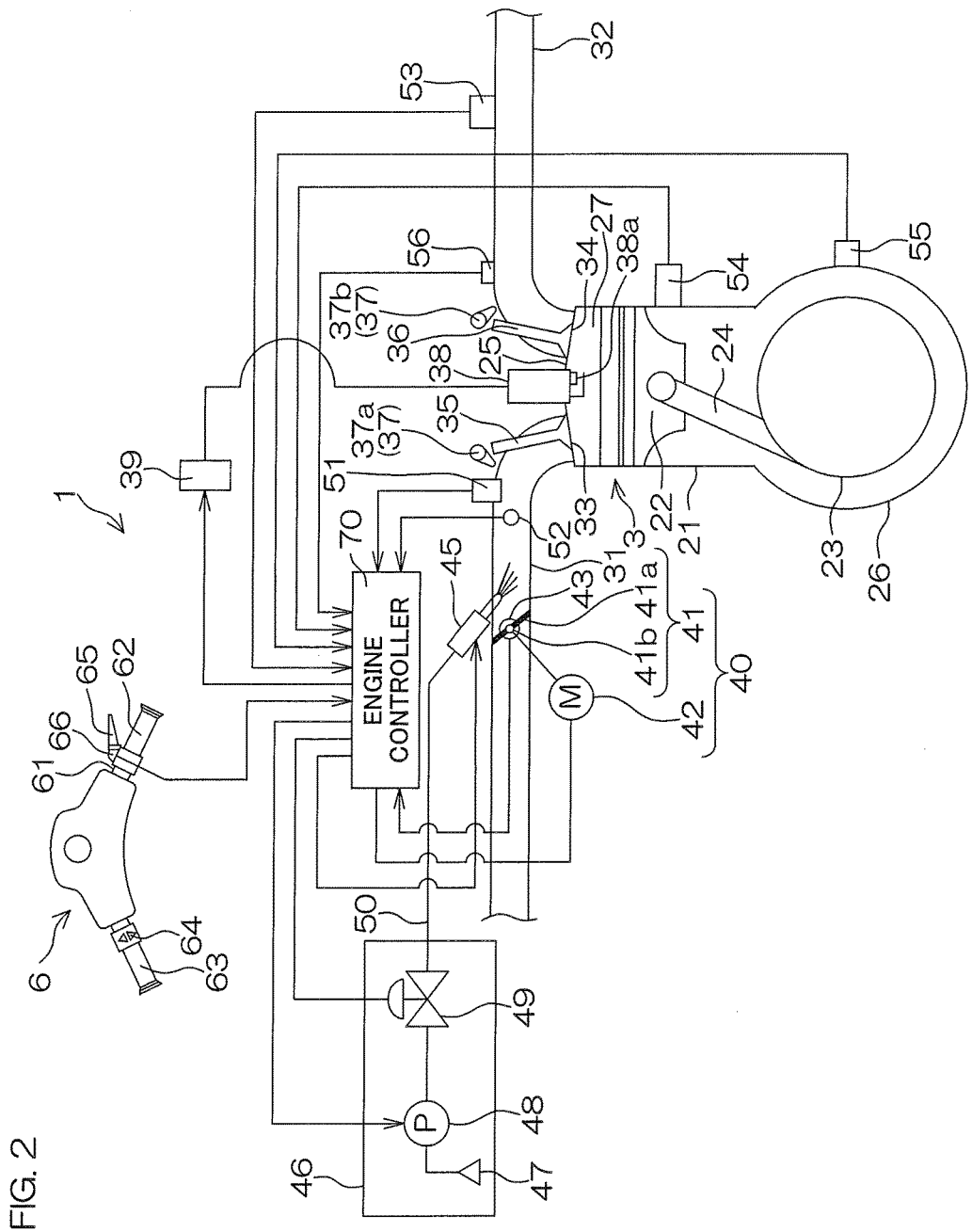
FIG. 2 is a schematic arrangement view for describing an arrangement relating to an engine.

FIG. 2 is a schematic arrangement view for describing an arrangement relating to the engine 3, that is, an arrangement of the engine system for a vessel propulsion device. The engine 3 includes a cylinder 21, a piston 22 that reciprocates inside the cylinder 21, a crankshaft 23, a connecting rod 24 that couples the piston 22 and the crankshaft 23, a cylinder head 25 coupled to the head portion of the cylinder 21, and a crank case 26 that houses the crankshaft 23.

A combustion chamber 27 is defined between the cylinder head 25 and the piston 22. An intake passage 31 passing through the cylinder head 25 and an exhaust passage 32 passing through the cylinder head 25 are communicatively connected to the combustion chamber 27. An intake port 33 that is communicatively connected to the intake passage 31 and faces the combustion chamber 27 is defined in the cylinder head 25. An intake valve 35 is arranged to open and close the intake port 33, and is held by the cylinder head 25. An exhaust port 34 that is communicatively connected to the exhaust passage 32 and faces the combustion chamber 27 is provided in the cylinder head 25. An exhaust valve 36 is arranged to open and close the exhaust port 34, and is held by the cylinder head 25. The intake valve 35 and the exhaust valve 36 are driven by a valve gear 37 that interlocks with the rotation of the crankshaft 23. The valve gear 37 includes, for example, a pair of cam shafts 37a and 37b that actuate the intake valve 35 and the exhaust valve 36, respectively. Further, an ignition plug 38 is attached to the cylinder head 25. The ignition plug 38 includes an ignition portion 38a at a position facing the combustion chamber 27. The ignition plug 38 receives energy supply from an ignition coil 39 to cause spark discharge at the ignition portion 38a. Accordingly, a gas mixture inside the combustion chamber 27 is ignited.

A throttle valve 41 to adjust an intake amount of the engine 3 is arranged in the intake passage 31. The throttle valve 41 may be, for example, a butterfly valve including a disk-shaped valve element 41a and a rotary shaft 41b coupled to the valve element 41a along the diameter direction of the valve element 41a. An electric throttle actuator 42 such as an electric motor is coupled to the throttle valve 41. Specifically, in the present preferred embodiment, the throttle valve 41 and the electric throttle actuator 42 constitute an electric throttle device 40 as an intake amount adjusting unit. The opening degree of the throttle valve 41 is detected by a throttle opening degree sensor 43. The throttle opening degree sensor 43 may be a sensor that detects a rotation angle of the rotary shaft 41b, or may be a sensor that detects displacement of an actuating element (for example, motor shaft) of the electric throttle actuator 42. Instead of providing the throttle opening degree sensor 43, an arrangement may be used in which an engine controller 70 that controls the electric throttle actuator 42 obtains a throttle opening degree by internal arithmetic processing based on a control signal of the electric throttle actuator 42.

An injector (fuel injection device) 45 is arranged in the intake passage 31 between the throttle valve 41 and the intake port 33. Fuel is supplied to the injector 45 from a fuel tank 46. A filter 47, a fuel pump 48, and a pressure control valve 49 are arranged inside the fuel tank 46. The fuel inside the fuel tank 46 is pumped by the fuel pump 48 and supplied to the injector 45 via a fuel pipe 50. The filter 47 filtrates the fuel to prevent foreign matter from entering the fuel pipe 50. The pressure control valve 49 keeps the pressure of the fuel supply to the injector 45 in a fixed range by absorbing pulsations caused by driving of the fuel pump 48. The injector 45 is arranged so as to inject the fuel toward the intake port 33. The injected fuel flows into the combustion chamber 27 together with air that flows in through the intake passage 31 and is vaporized to produce the mixture of air and the fuel. This gas mixture explosively burns due to spark discharge at the ignition plug 38.

The air pressure (intake pressure) inside the intake passage 31 is detected by an intake pressure sensor 51. The intake pressure sensor 51 detects an air pressure inside the intake passage 31 between the throttle valve 41 and the intake port 33. The temperature (intake temperature) of the air inside the intake passage 31 is detected by an intake temperature sensor 52. The intake temperature sensor 52 detects the temperature of the air inside the intake passage 31 between the throttle valve 41 and the intake port 33.

An exhaust air-fuel ratio sensor 53 is arranged in the exhaust passage 32. The exhaust air-fuel ratio sensor 53 is preferably an oxygen sensor that detects an oxygen concentration inside the exhaust passage 32.

Further, an engine temperature sensor 54 that detects a temperature (engine temperature) of the engine 3 is provided in the cylinder 21. When the engine 3 is a water-cooled engine, the engine temperature sensor 54 is preferably a water temperature sensor that detects the temperature of cooling water.

A crank angle sensor 55 to detect a rotation angle of the crankshaft 23 is arranged in the crank case 26. The crank angle sensor 55 generates a pulse signal each time the crankshaft 23 rotates a predetermined angle. By counting this pulse signal, the rotation angle of the crankshaft 23 is detected. By measuring an interval between the pulse signals, the rotation speed of the crankshaft 23 is detected. The rotation speed of the crankshaft 23 is the rotation speed of the engine 3.

A knocking sensor 56 that detects an occurrence of knocking in the engine 3 is attached in a vicinity of the cylinder head 25. The knocking sensor 56 needs only to be arranged at a position at which the knocking sensor 56 detects an impact (vibration) caused by the occurrence of knocking. Therefore, the knocking sensor 56 may be attached to, for example, the cylinder head 25, the exhaust passage 32, or the crank case 26.

The steering device 6 includes, in the present preferred embodiment, the handle bar 61 extending in the left-right direction and a pair of grips 62 and 63 attached to the left and right of the handle bar 61. An accelerator lever 65 as an accelerator operator is arranged ahead of one grip 62 (in the present preferred embodiment, the right grip). The accelerator lever 65 is arranged swingably in the front-rear direction, and is held at the foremost fully-closed position by the action of an elastic member not illustrated. From this state, an acceleration operation to increase the output of the engine 3 (specifically, the engine speed) is performed by pulling the accelerator lever 65 by a vessel operator to the operator side (rearward) to make the accelerator lever 65 approach the grip 62. The operation amount of the accelerator lever 65 is detected by an accelerator operation amount sensor 66. A forward-reverse drive selecting operation portion 64 to change the position of the reverse bucket 18 (refer to FIG. 1) is provided near the other grip 63 (left grip in the present preferred embodiment) of the handle bar 61.

To control the engine 3, an engine controller (ECU: Electronic Control Unit) 70 is provided.

The engine 3 is a four-stroke gasoline engine. Specifically, the engine 3 repeatedly performs an intake stroke, a compression stroke, an expansion stroke, and an exhaust stroke.

In the intake stroke, the piston 22 moves toward the crankshaft 23, the intake valve 35 is opened, the exhaust valve 36 is closed, and air is introduced into the combustion chamber 27. Along with this, at a predetermined timing, the injector 45 injects the fuel. Accordingly, the inside of the combustion chamber 27 is filled with the mixture of fuel and air.

In the compression stroke, the piston 22 moves toward the cylinder head 25, the intake valve 35 and the exhaust valve 36 are closed, and the gas mixture inside the combustion chamber 27 is compressed. At an ignition timing set at the end of the compression stroke, the ignition plug 38 causes spark discharge inside the combustion chamber 27 to ignite the gas mixture.

In the expansion stroke, in a state where the intake valve 35 and the exhaust valve 36 are closed, the ignited gas mixture burns and explosively expands, and accordingly, the piston 22 is displaced toward the crankshaft 23. This displacement of the piston 22 is converted into rotational motion of the crankshaft 23 by the connecting rod 24, and power to rotate the crankshaft 23 is generated.

In the exhaust stroke, the piston 22 moves toward the cylinder head 25, and in a state where the intake valve 35 is closed, the exhaust valve 36 is opened. Accordingly, exhaust remaining inside the combustion chamber 27 after burning is forced out to the exhaust passage 32.

Figure 3:
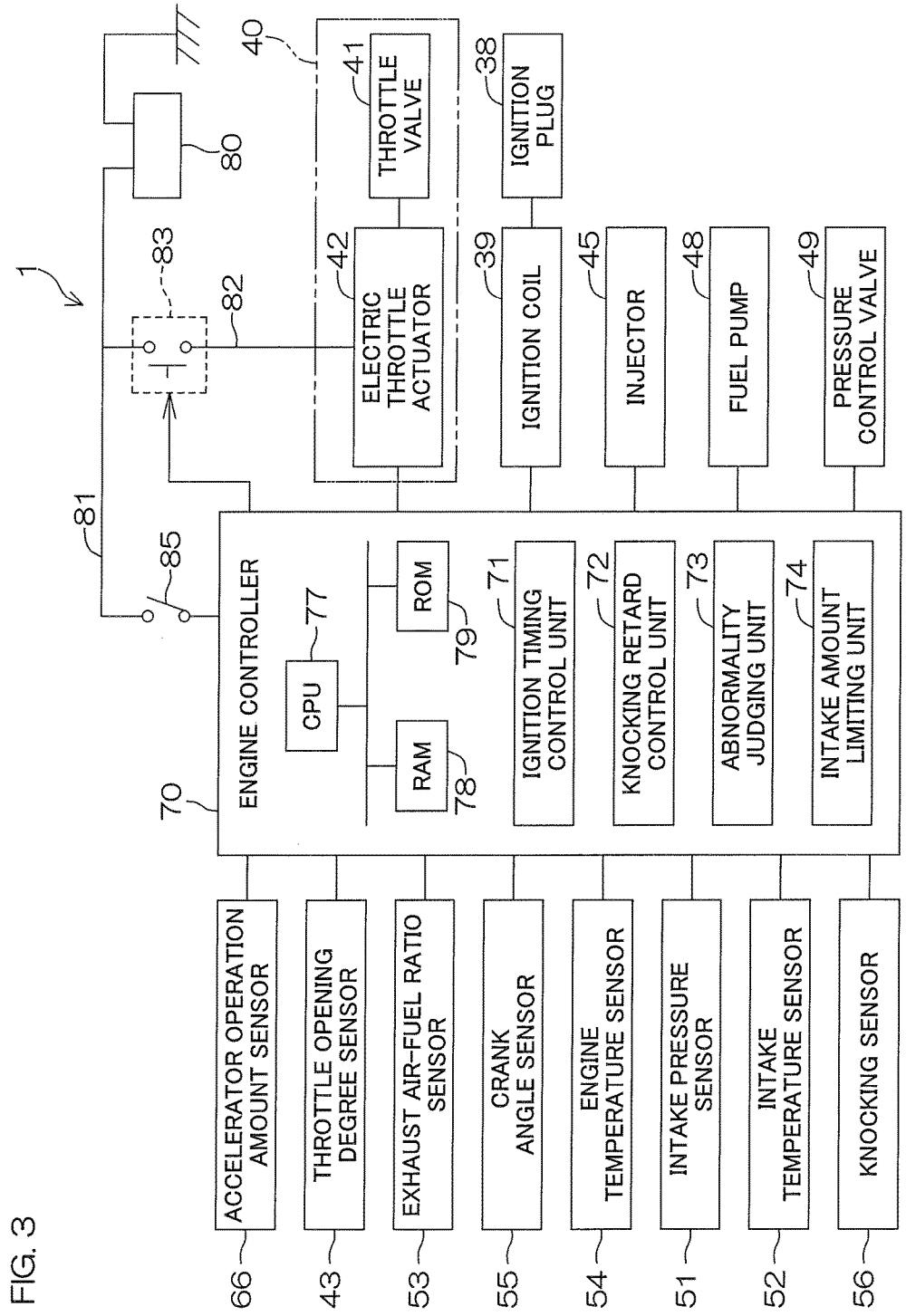
FIG. 3 is a block diagram for describing an electronic arrangement relating to control of the engine.

FIG. 3 is a block diagram for describing an electronic arrangement relating to control of the engine 3. Detection signals of the sensors 43, 51 to 56, and 66 are input into the engine controller 70. Based on outputs of these sensors 43, 51 to 56, and 66, the engine controller 70 controls the operations of the actuators, that is, the electric throttle actuator 42, the ignition coil 39, the injector 45, the fuel pump 48, and the pressure control valve 49. In detail, the engine controller 70 performs ignition timing control to variably control the ignition timing by changing the actuation timing of the ignition coil 39. The engine controller 70 controls the output of the engine 3 by controlling the electric throttle actuator 42 according to an output signal of the accelerator operation amount sensor 66. Further, the engine controller 70 performs intake amount limiting control to limit the intake amount by limiting the maximum value of the throttle opening degree to a value smaller than usual by controlling the electric throttle actuator 42 as necessary. Further, the engine controller 70 performs fuel injection amount control to variably set the fuel injection amount according to the output signal of the accelerator operation amount sensor 66 and an operation state of the engine 3 (engine speed and load, for example).

Electric power from a battery 80 is supplied to the engine controller 70 via an electric supply line 81. Electric power is supplied via a branched electric supply line 82 branched from the electric supply line 81 to the actuators 39, 42, 45, 48, and 49. However, in FIG. 3, only the connection between the branched electric supply line 82 and the electric throttle actuator 42 is shown. In the middle of the branched electric supply line 82, a relay 83 that is opened and closed by the engine controller 70 is interposed. An ignition key switch 85 is interposed in the electric supply line 81 between the branched portion of the branched electric supply line 82 and the engine controller 70. Therefore, by making the ignition key switch 85 conductive, the engine controller 70 starts its controlling operation.

The engine controller 70 includes a CPU 77, a RAM 78, and a ROM 79, and includes a computer. The engine controller 70 realizes functions as a plurality of functional processing portions by execution of the programs stored in the ROM 79 by the CPU 77. The RAM 78 is used as a temporary storage memory when the CPU 77 performs arithmetic processing. The plurality of functional processing portions include an ignition timing control unit 71, a knocking retard control unit 72, an abnormality judging unit 73, and an intake amount limiting unit 74, etc.

The ignition timing control unit 71 controls the ignition timing of the ignition plug 38 by controlling the electrical conduction/cut-off timings for the ignition coil 39. The knocking retard control unit 72 gives a command to retard or advance the ignition timing according to the output of the knocking sensor 56 to the ignition timing control unit 71. The abnormality judging unit 73 is configured and programmed to judge that an abnormality has occurred when a state where the knocking sensor 56 repeatedly detects knocking in a short time continues. When the abnormality judging unit 73 judges an occurrence of an abnormality, the intake amount limiting unit 74 is configured and programmed to limit the maximum value of the throttle opening degree to a limit opening degree smaller than the full opening by controlling the throttle actuator 42, and accordingly, limits the maximum intake amount.

Figure 4:
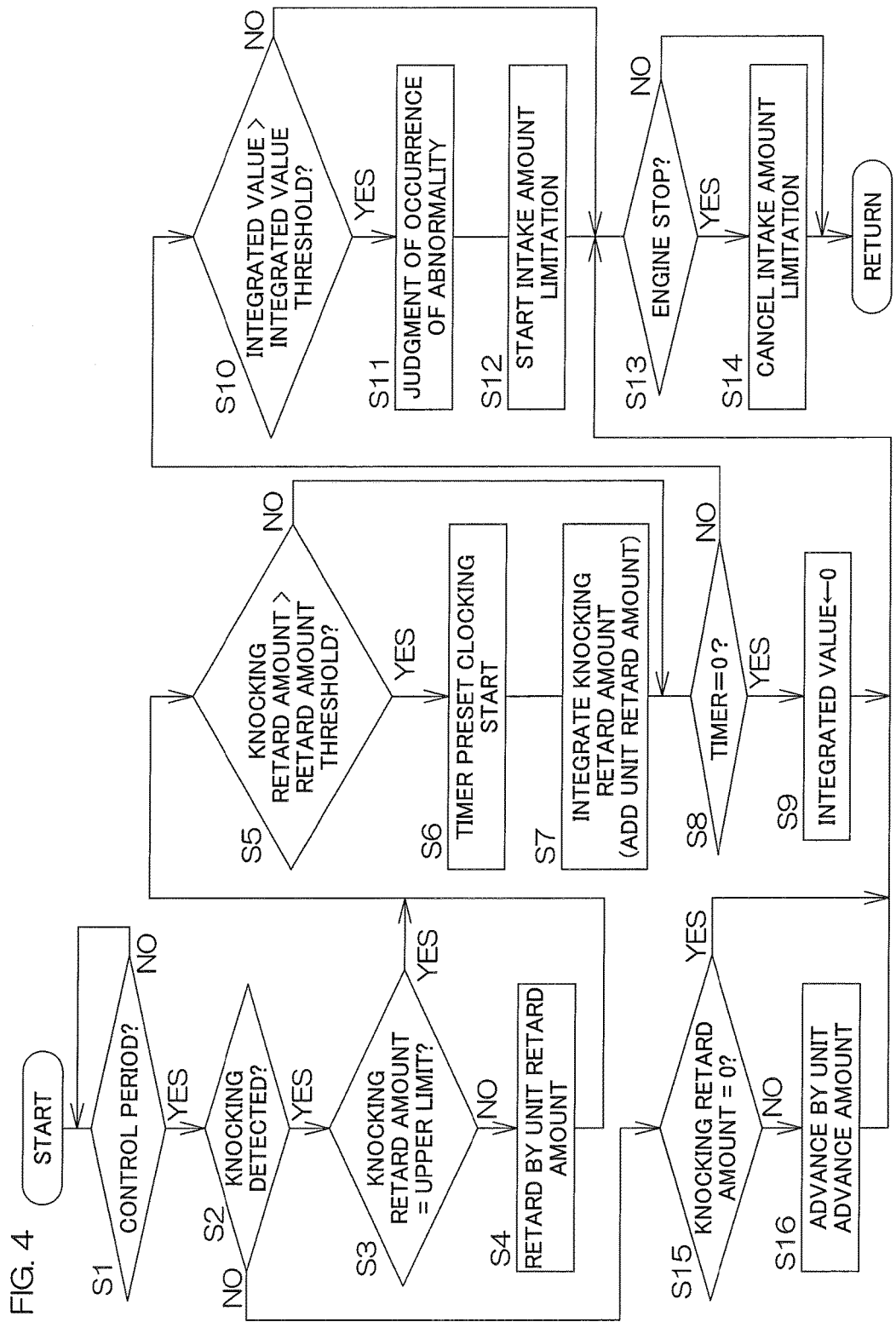
FIG. 4 is a flowchart for describing contents of a control to reduce or prevent knocking of the engine.

FIG. 4 is a flowchart for describing contents of the control to reduce or prevent knocking of the engine 3. The engine controller 70 monitors the output signal of the knocking sensor 56 in each predetermined control period (for example, about 1 second) (Steps S1 and S2). When the knocking sensor 56 detects knocking of the engine 3 (Step S2: YES), the engine controller 70 judges whether or not the knocking retard amount has reached an upper limit (for example, about 3 degrees) (Step S3, function of the knocking retard control unit 72).

The knocking retard amount is a retard amount caused due to knocking detection. The retard amount represents a retard amount of the ignition timing retarded with respect to the normal ignition timing. The normal ignition timing is defined by a crank angle (normal ignition crank angle) of the crankshaft 23. The retard amount of the ignition timing retarded with respect to the normal ignition timing is represented by an angular displacement amount of the crankshaft 23 from the normal ignition crank angle. The retard amount corresponds to this angular displacement amount. Specifically, the ignition plug 38 is controlled by the engine controller 70 (ignition timing control unit 71) so as to cause spark discharge at a crank angle obtained by adding the retard amount to the normal ignition crank angle. The retard amount may be set for knocking control, and in addition, may be set for limiting the output of the engine 3. The knocking retard amount is a retard amount set for knocking control. An excessive retard amount causes a failure such as a misfire of engine 3 or deterioration of fuel efficiency, so that an upper limit of the knocking retard amount is determined.

When the knocking retard amount does not reach the upper limit (Step S3: NO), the engine controller 70 increases the knocking retard amount by a unit retard amount (for example, about 0.3 degrees) (Step S4, function of the knocking retard control unit 72). When the knocking retard amount reaches the upper limit (Step S3: YES), the knocking retard amount is kept at the upper limit.

The engine controller 70 compares the knocking retard amount with a predetermined retard amount threshold (for example, about 2 degrees) (Step S5, function of the abnormality judging unit 73). The retard amount threshold is a threshold determined in advance for judging the possibility that an abnormality has occurred in the engine 3. The retard amount threshold is preferably set to be larger than the unit retard amount and smaller than the upper limit of the retard amount. When the knocking retard amount is larger than the retard amount threshold (Step S5: YES), the engine controller 70 presets an integration limit time (for example, about 15 seconds) determined in advance to limit a knocking retard amount integration time in a timer, and makes the timer perform clocking (Step S6, function as the abnormality judging unit 73 and the integrated value operating unit). Then, the engine controller 70 calculates an integrated value of the knocking retard amount (Step S7, function as the abnormality judging unit 73 and the integrated value operating unit). In detail, the unit retard amount is added to the previous integrated value. When the knocking retard amount is equal to or less than the retard amount threshold (Step S5: NO), the processing in Steps S6 and S7 is omitted. Specifically, without presetting the timer, the clocking operation of the timer is continued, and the integrated value of the knocking retard amount is kept at the previous value.

Next, the engine controller 70 judges whether the timer has completed clocking of the integration limit time (Step S8, function as the abnormality judging unit 73 and the integrated value operating unit). When the timer completes clocking of the integration limit time (Step S8: YES), the integrated value of the knocking retard amount is initialized to zero (Step S9, function as the abnormality judging unit 73 and the integrated value operating unit), and the processing is advanced to Step S13.

When the timer does not complete clocking of the integration limit time (S8: NO), the engine controller 70 judges whether the integrated value of the knocking retard amount has exceeded the predetermined integrated value threshold (Step S10, function as the abnormality judging unit 73 and an integrated value comparing unit). When the result of this judgment is affirmative, the engine controller 70 judges that an abnormality has occurred in the engine 3 (Step S11, function as the abnormality judging unit 73). When the integrated value of the knocking retard amount does not exceed the integrated value threshold (Step S10: NO), the processing is advanced to Step S13.

An abnormality of the engine 3 is an abnormality in which knocking cannot be reduced or prevented by retard control, and in detail, corresponds to a case where knocking repeatedly occurs due to use of a fuel having an octane number lower than that of a designated kind of fuel. When an occurrence of an abnormality is judged (Step S10: YES, Step S11), the engine controller 70 controls the electric throttle actuator 42 to perform intake amount limiting control that limits the maximum value of the throttle opening degree to a limit opening degree smaller than the throttle opening degree upper limit (full opening) (Step S12, the intake amount limiting unit 74). The throttle opening degree upper limit is the largest throttle opening degree (full opening) in terms of the structure of the throttle valve 41. On the other hand, the throttle opening degree maximum value is a limit value over which a throttle opening degree is prevented from being set by control performed by the engine controller 70. When the intake amount limiting control is not performed, the throttle opening degree maximum value matches the throttle opening degree upper limit (full opening). When the intake amount limiting control is performed, the throttle opening degree maximum value is a limit opening degree smaller than the throttle opening degree upper limit. The limit opening degree may be a fixed value (for example, approximately 20% of the throttle opening degree upper limit), or may be a value that varies according to the operation state of the engine 3.

When starting the intake amount limiting control, the engine controller 70 judges whether or not the engine 3 has stopped (Step S13). Stopping of the engine 3 is preferably judged based on the output signal of the crank angle sensor 55. When the operation of the engine 3 is continued (Step S13: NO), the intake amount limiting control is continued, and the processing in this control period is ended.

When the engine 3 is stopped (Step S13: YES), the engine controller 70 releases or cancels the intake amount limiting control (Step S14). Specifically, the throttle opening degree maximum value is returned to the throttle opening degree upper limit that is a normal value. This processing is substantially omitted if the intake amount limiting control is not performed.

In Step S2, when the knocking sensor 56 detects no knocking of the engine 3 (Step S2: NO), the engine controller 70 judges whether or not the knocking retard amount is zero, that is, whether or not the ignition timing is the normal ignition timing (Step S15). When the knocking retard amount is not zero (Step S15: NO), the engine controller 70 advances the ignition crank angle by a unit advance amount (for example, about 0.2 degrees) (Step S16, function of the knocking retard control unit 72), that is, makes the ignition crank angle closer to the normal ignition crank angle, and advances the processing to Step S13. When the knocking retard amount is zero (Step S15: YES), the processing of Step S16 is omitted and the processing is advanced to Step S13.

By performing the above-described processing, when knocking is repeatedly detected at short time intervals within the integration limit time while the knocking retard amount is over the retard amount threshold, the timer is repeatedly preset. Therefore, the integrated value of the knocking retard amount reaches the integrated value threshold, an occurrence of an abnormality is judged, and according to this, the intake amount limiting control is performed. When knocking does not occur repeatedly at short time intervals, the timer ends clocking of the integration limit time, and the integrated value is initialized, so that an abnormality is not judged. When an occurrence of an abnormality is judged and the intake amount limiting control is started, this intake amount limiting control is continued until the engine 3 stops. By the intake amount limiting control, the output of the engine 3 is limited, so that knocking does not easily occur. Therefore, when the intake amount limiting control is started, the knocking retard amount is reduced, and the ignition timing returns to the normal ignition timing. Accordingly, knocking reduction or prevented by retard control switches to knocking control by limiting the intake amount.

After starting the intake amount limiting control, the processing in Steps S5 to S12 may be omitted.

Figure 5:
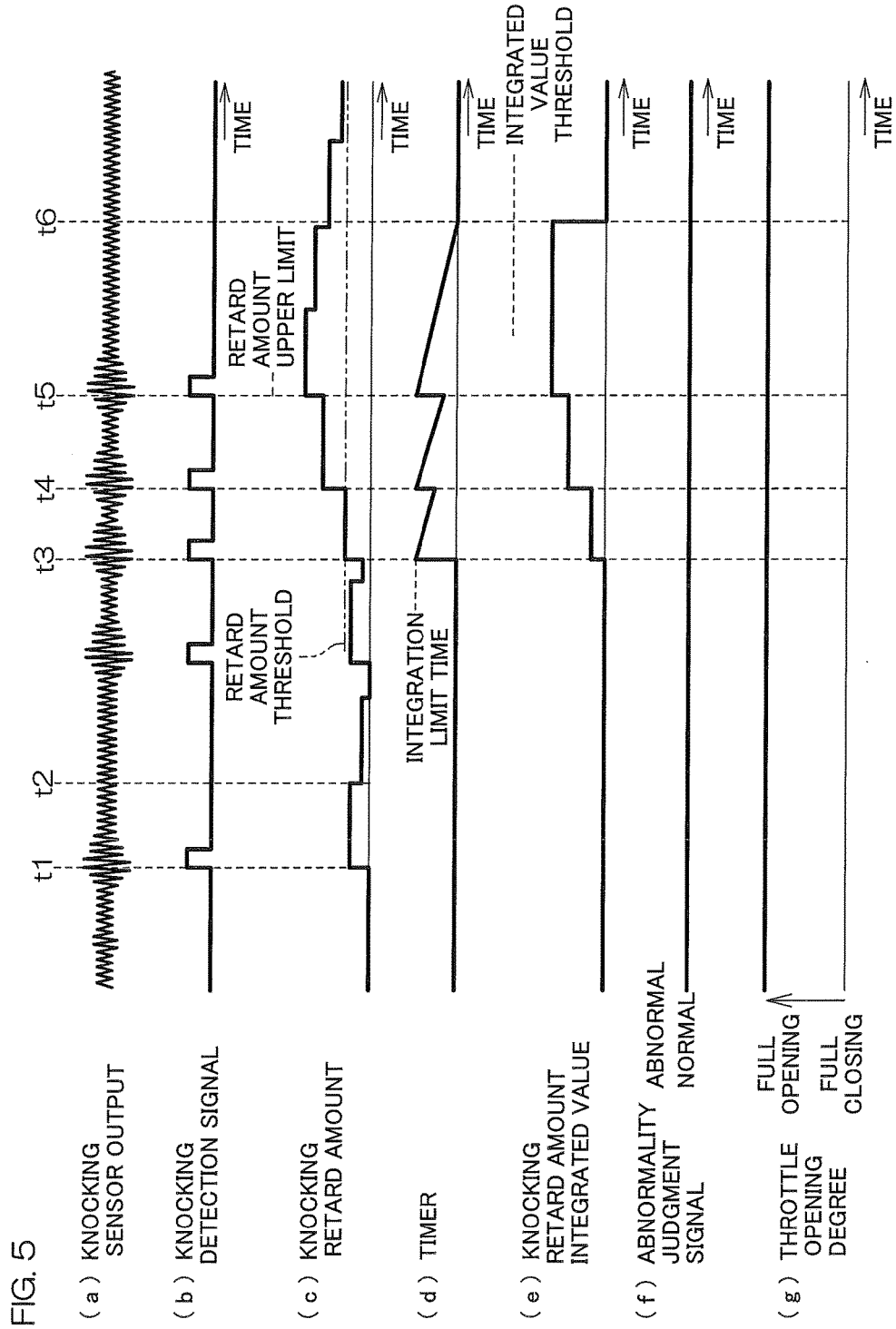
FIG. 5 is a time chart for describing an operation example showing an operation in a case where a designated kind of fuel is used, and an abnormality is not judged.

FIG. 5 is a time chart for describing an operation example, and shows an operation when the designated kind of fuel (with the designated octane number) is used and an abnormality is not judged. FIG. 5(a) shows changes with time of the output of the knocking sensor 56, FIG. 5(b) shows a knocking detection signal generated by using the output of the knocking sensor 56, FIG. 5(c) shows changes with time of the knocking retard amount, FIG. 5(d) shows changes with time of the timer clocked time, FIG. 5(e) shows changes with time of the integrated value of the knocking retard amount, FIG. 5(f) shows an abnormality judgment signal, and FIG. 5(g) shows changes with time of the throttle opening degree.

The engine controller 70 generates a threshold signal that fluctuates according to noise contents included in the output of the knocking sensor 56. The engine controller 70 compares the output signal (FIG. 5(a)) of the knocking sensor 56 with the threshold signal in each control period. When the amplitude of the output signal of the knocking sensor 56 is larger than that of the threshold signal, the engine controller 70 generates a pulsed knocking detection signal (FIG. 5(b)). In response to this knocking detection signal, the engine controller 70 increases the knocking retard amount by the unit retard amount (for example, the time t1). When the amplitude of the output signal of the knocking sensor 56 is not more than that of the threshold signal, the knocking detection signal is not generated. In this case, the engine controller 70 reduces the knocking retard amount by the unit advance amount (for example, the time t2).

When the knocking detection signal is generated and the knocking retard amount is increased by the unit retard amount, if the knocking retard amount exceeds the retard amount threshold, the integration limit time is preset in the timer, and clocking of the integration limit time is started (for example, the time t3). If the next knocking detection signal is generated before this clocking of the timer ends, and if the knocking retard amount at this time exceeds the retard amount threshold, then the integration limit time is preset again in the timer, and clocking of the timer is restarted by using the preset integration limit time as an initial value (for example, the time t4).

The unit retard amount is added to the integrated value of the knocking retard amount when the knocking detection signal is generated and the knocking retard amount exceeds the retard amount threshold (the times t3, t4, and t5). The integrated value of the knocking retard amount is initialized to an initial value "zero" when clocking of the timer ends (the time t6).

When the throttle opening degree is set to the full opening and a rapid accelerating operation is performed, knocking temporarily occurs, and according to this, the knocking detection signal is generated. However, when the designated kind of fuel is used, knocking is quickly reduced or prevented by retard control, and in a short time, knocking is eliminated. Accordingly, the knocking retard amount is reduced by the unit retard amount and is converged to zero, and the ignition timing returns to the normal ignition timing. Since no knocking detection signal is generated, the timer ends clocking of the integration limit time, so that the integrated value of the knocking retard amount is initialized to zero. Therefore, an abnormality is not judged, and the intake amount limiting control is not performed, either.

Figure 6:
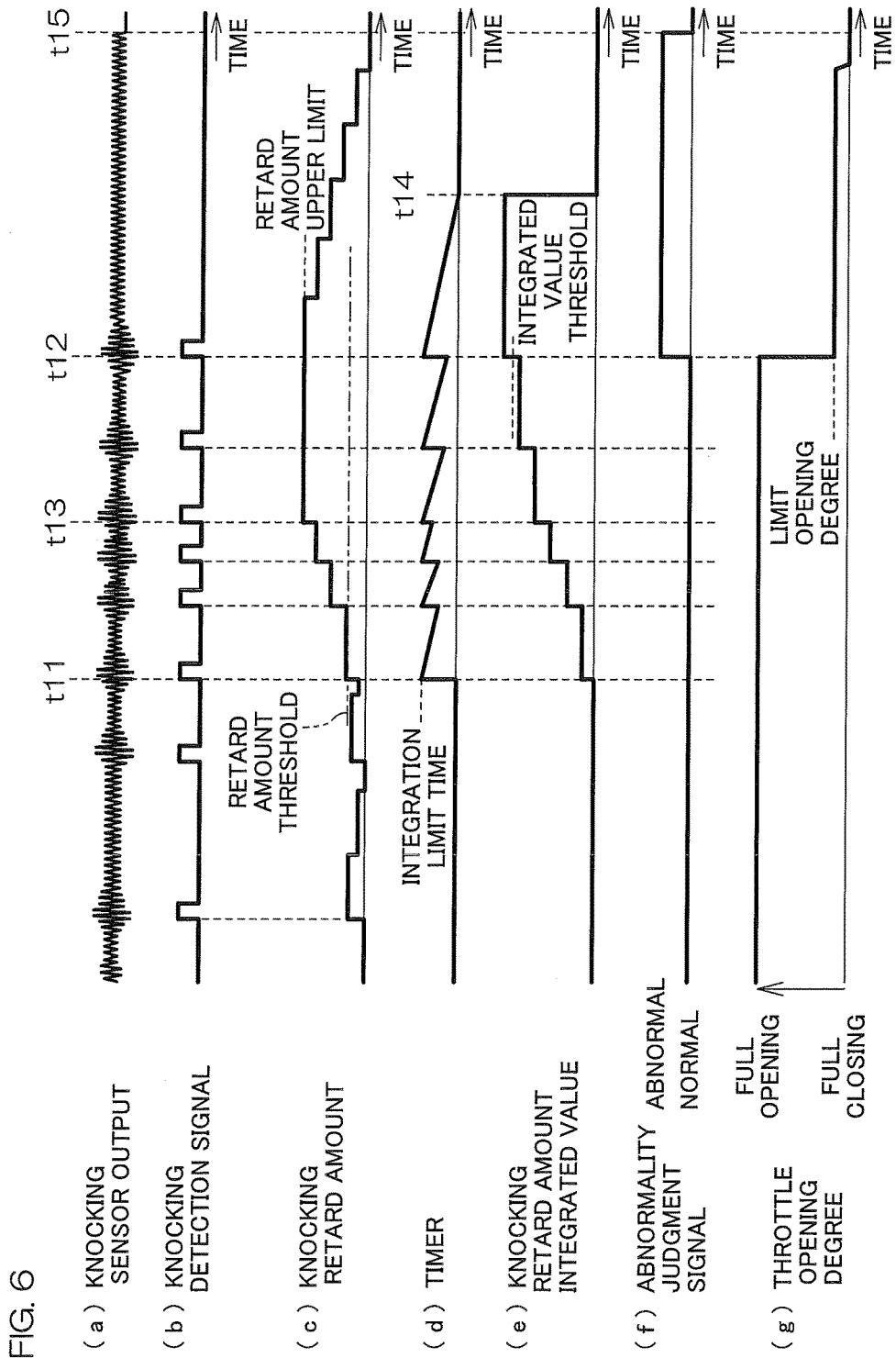
FIG. 6 is a time chart for describing another operation example showing an operation in a case where a fuel having an octane number lower than that of the designated kind of fuel is used and judgment of an abnormality is made.

FIG. 6 is a time chart for describing another operation example, and shows an operation when a fuel having an octane number lower than that of the designated kind (having a designated octane number) is used and judgment of an abnormality is made. In detail, this corresponds to a case where regular gasoline or inferior fuel is supplied to the engine for which high-octane gasoline is designated. Similar to FIG. 5, FIG. 6(a) shows changes with time of the output signal of the knocking sensor 56, FIG. 6(b) shows a knocking detection signal generated by using the output of the knocking sensor 56, FIG. 6(c) shows changes with time of the knocking retard amount, FIG. 6(d) shows changes with time of a timer clocked time, FIG. 6(e) shows changes with time of the integrated value of the knocking retard amount, FIG. 6(f) shows an abnormality judgment signal, and FIG. 6(g) shows changes with time of the throttle opening degree.

When the throttle opening degree is set to the full opening and the water jet propulsion watercraft 1 is made to cruise, knocking repeatedly occurs, and the knocking detection signal is repeatedly generated at short time intervals. Therefore, after the knocking retard amount exceeds the retard amount threshold and the timer starts clocking, the next knocking detection signal is generated before this timer ends clocking of the integration limit time, and a state where the knocking retard amount is larger than the retard amount threshold continues (the time t11 to t12). Along with this, the knocking retard amount increases in increments of the unit retard amount, and finally reaches the retard amount upper limit (the time t13).

Since the timer does not end clocking of the integration limit time, the integrated value of the knocking retard amount is not initialized, and therefore, the integrated value finally reaches the integrated value threshold (the time t12). Accordingly, the engine controller 70 generates an abnormality judgment signal, limits the throttle opening degree, and starts the intake amount limiting control (the time t12). Therefore, even when a vessel operator keeps the accelerator lever 65 (refer to FIG. 2) at the full opening position, the throttle opening degree does not reach the full opening, and is kept at the predetermined limit opening degree.

By keeping the throttle opening degree at the limit opening degree, knocking is reduced or prevented. Accordingly, no knocking detection signal is generated, so that the knocking retard amount gradually approaches zero. In addition, the timer ends clocking of the integration limit time, and accordingly, the integrated value of the knocking retard amount is initialized to zero (the time t14).

The judgment of an abnormality is not canceled until the engine 3 is stopped, and the limited intake amount is also continued until the engine 3 stops. By stopping the engine 3, the judgment of an abnormality is canceled, and the limited intake amount is also canceled (the time t15). However, even when the engine 3 is operated next, as long as the fuel is not replaced with the designated kind of fuel, judgment of an abnormality and limited intake amount are performed through the same operations.

As described above, according to the present preferred embodiment, when knocking is detected, the ignition timing of the ignition plug 38 is retarded by the unit retard amount, and accordingly, knocking is reduced or prevented. On the other hand, when the frequency of an occurrence of knocking is high and the state where knocking is detected at intervals within the integration limit time clocked by the timer continues, based on the continued state, it is judged that an abnormality has occurred. Based on this judgment of an abnormality, the maximum opening degree of the throttle valve 41 is limited to the limit opening degree, and the intake amount of the engine 3 is limited. Accordingly, the engine output is limited, so that knocking is reduced or prevented. Thus, an occurrence of an abnormality is judged based on the continued state of knocking detection at intervals within the integration limit time, so that even when the knocking level cannot be converged to a low level by retard control, an occurrence of an abnormality is reliably judged. Therefore, when an abnormality occurs, knocking control by limiting the intake amount is reliably started. Accordingly, damage to the engine 3 due to knocking is reduced.

In the present preferred embodiment, when the limited intake amount is started based on judgment of an abnormality, the limited intake amount is continued until the engine stops. In other words, the limited intake amount is released or canceled according to the engine stopping. Therefore, even if the frequency of knocking lowers due to the limited intake amount, the limited intake amount is not released or canceled.

In the prior art described in US 2004/0099237A1, in a case where the limited intake amount is performed and knocking is eliminated, the limited intake amount is canceled. Therefore, when an abnormality occurs in the engine, even if the knocking level is converged to the low level by retard control and the limited intake amount is started, when knocking is eliminated, the limited intake amount is canceled. Therefore, although an abnormality occurs, the operation state returns to the normal operation state, and leads to a state where knocking frequently occurs again. This repetition damages the engine, and lowers the cruising feeling due to frequent changes of the engine output.

Therefore, the present preferred embodiment is arranged so that when the limited intake amount is started based on judgment of an abnormality, the limited intake amount is continued until the engine stops. Accordingly, damage to the engine 3 is reduced, and the cruising feeling when an abnormality occurs is improved.

In the present preferred embodiment, the normal ignition timing of the ignition plug 38 is set to the retard side with respect to the MBT (Minimum advance for Best Torque). The engine 3 as the drive source of the jet propulsion device 4 is operated at the maximum output point in most of the period in which the water jet propulsion watercraft 1 is made to cruise. Therefore, by setting the normal ignition timing to the retard side with respect to the MBT, without requiring retard control, the engine 3 is operated while reducing or prevented knocking. On the other hand, the retard control margin is small, so that when an abnormality occurs in the engine 3 (for example, when a non-designated fuel is used), knocking reduction or prevention by retard control may become insufficient. In the present preferred embodiment, the limited intake amount is started based on judgment of an abnormality, so that when an abnormality occurs, switching to knocking control by limiting the intake amount is performed. Accordingly, as well as in a normal state, in a state where an abnormality occurs, knocking is reliably reduced or prevented and damage to the engine 3 is reduced.

In the present preferred embodiment, the limited intake amount is not performed until an abnormality is judged. Therefore, until an abnormality is judged, knocking is reduced or prevented exclusively by retard control. Accordingly, as long as no abnormality occurs, fluctuation of the engine output according to limited intake amount does not repeatedly occur, so that knocking is significantly reduced or prevented without greatly lowering the cruising feeling.

In the present preferred embodiment, the integrated value of knocking retard amount to be used for judgment of an abnormality is increased when knocking is detected at intervals within the integration limit time, and is initialized when an elapsed time from the previous knocking detection exceeds this integration limit time. When an abnormality occurs, knocking is repeatedly detected at intervals within the integration limit time, and the integrated value increases monotonically and reaches the integrated value threshold. Accordingly, an occurrence of an abnormality is judged. Thus, an occurrence of an abnormality is reliably judged, and based on this judgment, the limited intake amount is started.

In the present preferred embodiment, on the condition that the knocking retard amount exceeds the predetermined retard amount threshold, the integrated value of the knocking retard amount is increased. Accordingly, the state where knocking frequently occurs although retard control exceeding the retard amount threshold is performed is detected. According to this, a more reliable judgment of an abnormality is made.

In the present preferred embodiment, the integrated value of knocking retard amount is increased in increments of the unit retard amount. Therefore, the integrated value becomes a value directly relating to the knocking retard amount, and is an exact index relating to a possibility of an occurrence of an abnormality. Therefore, judgment of an abnormality using the integrated value is made more reliably.

Further, in the present preferred embodiment, the output of the knocking sensor 56 is monitored in each control period (detection period), and when knocking occurs, the ignition timing is retarded by the unit retard amount, and when no knocking occurs, the ignition timing is advanced by the unit advance amount. Accordingly, a proper ignition timing according to the state of the engine 3 is set. When an abnormality occurs, knocking occurs even if the ignition timing is repeatedly retarded by each unit retard amount, and in this case, an occurrence of an abnormality is judged, and switching to knocking control by limiting the intake amount is performed.

Figure 7:
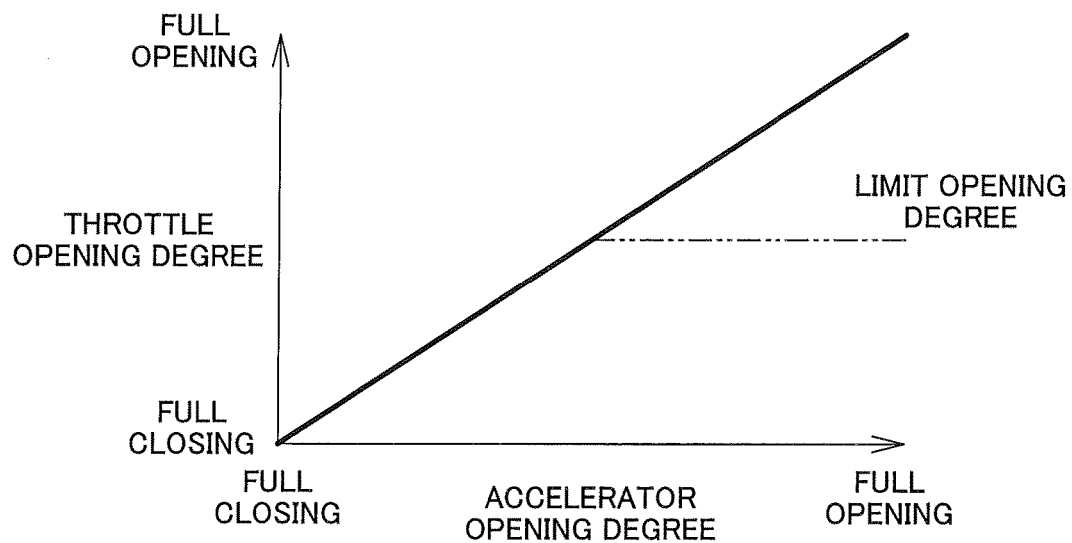
FIG. 7 is a drawing for describing an example of an intake amount limiting control, showing a change in throttle opening degree with respect to an accelerator opening degree.

FIG. 7 is a drawing for describing a detailed example of the intake amount limiting control, and shows changes in throttle opening degree with respect to the accelerator opening degree. The accelerator opening degree is an operation amount of the accelerator lever 65 detected by the accelerator operation amount sensor 66. The accelerator lever 65 can be operated from a fully closed position to a fully opened position. When the limited intake amount is not performed, as shown by the solid line in FIG. 7, the engine controller 70 changes the throttle opening degree from full closing to full opening according to the accelerator opening degree. In the example of FIG. 7, with respect to the increase in accelerator opening degree, the throttle opening degree increases monotonically (specifically, linearly) from full closing to full opening. In the intake amount limiting control, as shown by the alternate long and two short dashed line in FIG. 7, the throttle opening degree is limited so that a limited opening degree smaller than full opening becomes a maximum value of the throttle opening degree. Specifically, in a small opening degree section in which the accelerator opening degree is comparatively small, the throttle opening degree increases monotonically (specifically, linearly) according to the accelerator opening degree. On the other hand, in a large opening degree section exceeding a predetermined accelerator opening degree threshold, the throttle opening degree is kept at a fixed limit opening degree without depending on the accelerator opening degree.

In this operation example shown in FIG. 7, even when the intake amount limiting control is performed, in the small opening degree section, the output of the engine 3 is adjusted with an operation similar to the operation in a normal state.

Figure 8:
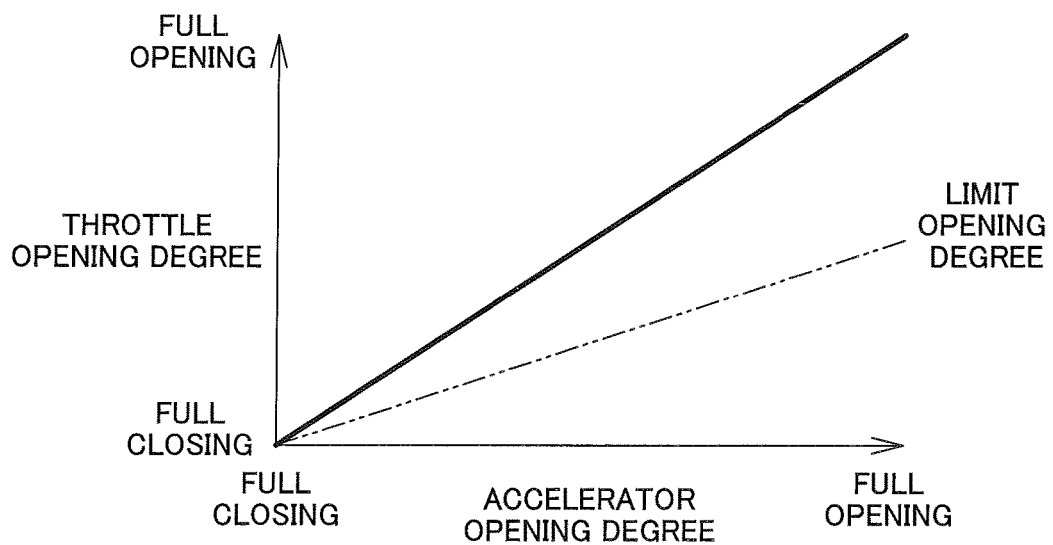
FIG. 8 is a drawing for describing another example of an intake amount limiting control, showing a change in throttle opening degree with respect to an accelerator opening degree.

FIG. 8 is a drawing for describing another detailed example of the intake amount limiting control, and shows changes in throttle opening degree with respect to the accelerator opening degree similar to FIG. 7. In this detailed example, the rate of change (inclination) of the throttle opening degree to the accelerator opening degree differs between a normal state and an intake amount limiting state, and is smaller in the intake amount limiting state. The characteristic (first characteristic) in the normal state shown by the solid line in FIG. 8 is the same as that in FIG. 7. In the intake amount limiting state, according to the second characteristic shown by the alternate long and two short dashed line in FIG. 8, the throttle opening degree changes monotonically (linearly in this example) from full closing to the limit opening degree with respect to the change from full closing to full opening of the accelerator opening degree. Therefore, in the case of the second characteristic, the rate of change of the throttle opening degree to the accelerator opening degree is smaller than that of the first characteristic (characteristic in a normal state).

In the operation example shown in FIG. 8, the throttle opening degree changes with respect to the whole operation range of the accelerator lever 65, and the output of the engine 3 is adjusted by using the whole operation range of the accelerator lever 65.

Figure 9:
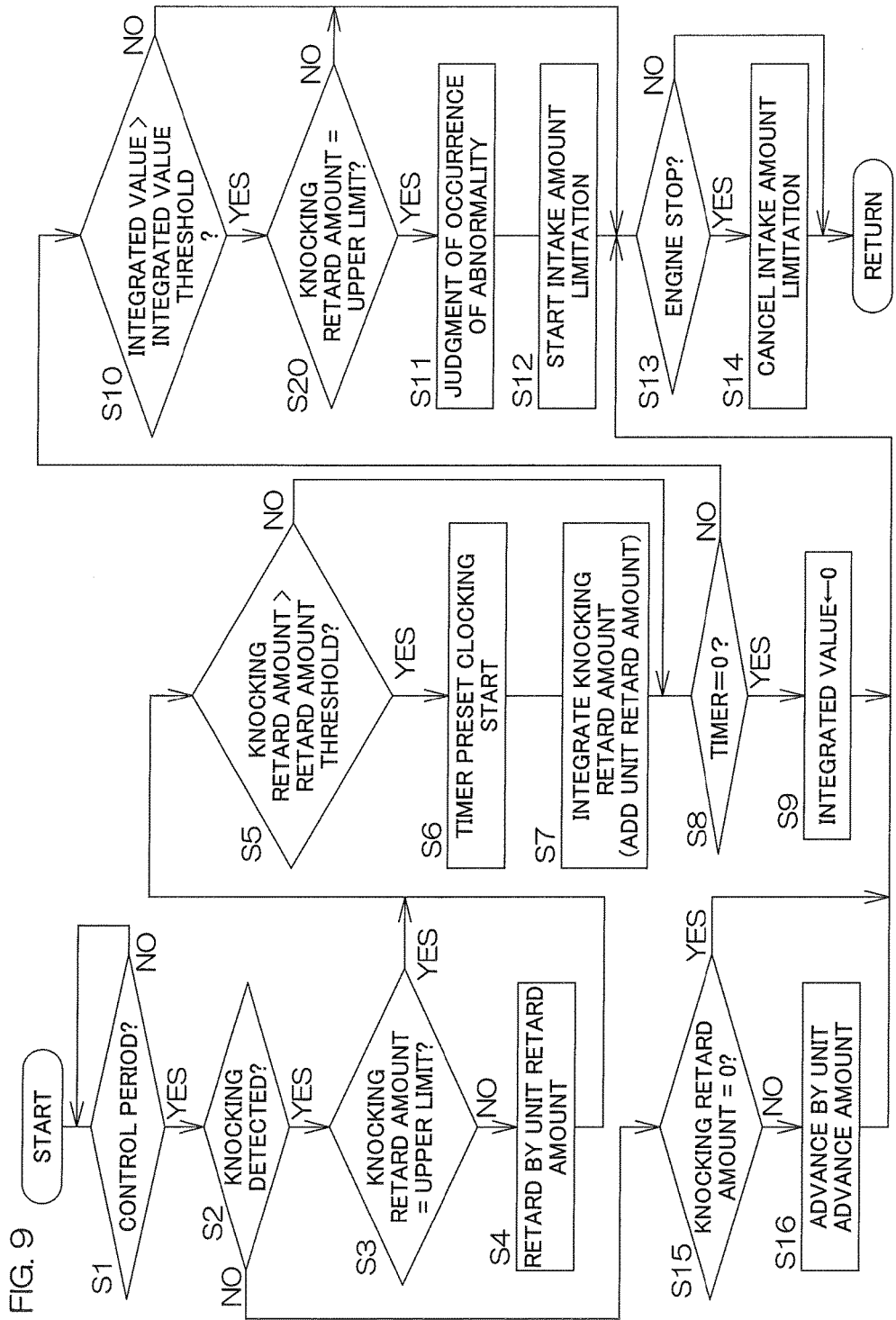
FIG. 9 is a flowchart for describing another preferred embodiment of the present invention.

FIG. 9 is a flowchart for describing another preferred embodiment of the present invention. In the description of this preferred embodiment, FIG. 1 to FIG. 3 and FIG. 5 to FIG. 8 described above are referred to again. In FIG. 9, to steps in which the same processing as in the steps shown in FIG. 4 described above is performed, the same reference symbols are attached, and description thereof is omitted.

In the present preferred embodiment, on the condition that the integrated value of the knocking retard amount exceeds the integrated value threshold (Step S10) and the knocking retard amount is at the upper limit (Step S20), judgment of an occurrence of an abnormality (Step S11) is made. Accordingly, upon confirming that knocking reduction or prevention by retard control has reached a limit, judgment of an abnormality is made and the limited intake amount (Step S12) is started.

Thus, according to the present preferred embodiment, when the knocking retard amount reaches the upper limit and the retard control reaches a limit, judgment of an abnormality is made. Accordingly, judgment of an abnormality is made more reliably, and a transition to intake amount limiting control based on judgment of an abnormality is properly made.

Figure 10:
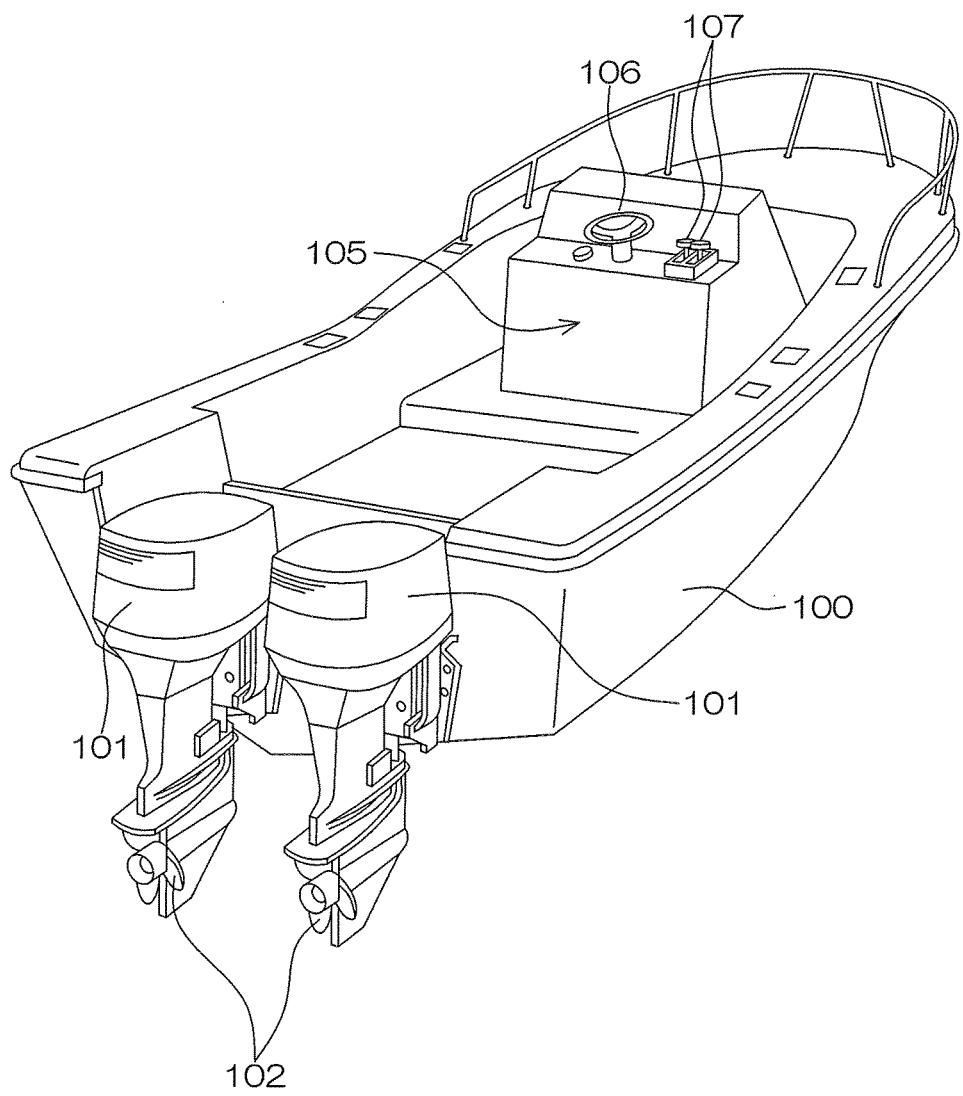
FIG. 10 is a perspective view for describing a configuration of a vessel according to still another preferred embodiment of the present invention.

FIG. 10 is a perspective view for describing a configuration of a vessel according to still another preferred embodiment of the present invention. This vessel is an outboard motor watercraft with outboard motors 101 as a vessel propulsion device. At the stern of a vessel body 100, two outboard motors 101 are provided. Each outboard motor 101 incorporates an engine, and includes a screw 102 to be driven to rotate by the engine. The outboard motors 101 are provided turnably to the left and right with respect to the vessel body 100. On the front side of the vessel body 100, a steering station 105 is provided. The steering station 105 is provided with a steering wheel 106 to perform steering and two levers 107 (accelerator operating elements) to adjust the outputs of the two outboard motors 101.

By turning the steering wheel 106 to the left and right, due to an operation of a turning mechanism not illustrated, the two outboard motors 101 turn to the left and right in conjunction with each other with respect to the vessel body 100. Accordingly, the traveling direction of the vessel body 100 is capable of being easily changed to the left and right. When the vessel operator tilts the lever 107 forward, the rotation of the engine is transmitted to the screws 102. The rotation directions of the screws 102 at this time are forward rotation directions that give thrust in the forward drive direction to the vessel body 100. When the lever 107 is further tilted forward, according to the operation amount, the throttle opening degree of the engine increases, and the output of the engine (in detail, the engine speed) increases. Also when the lever 107 is tilted rearward, the rotation of the engine is transmitted to the screws 102. However, at this time, the rotation directions of the screws 102 are backward rotation directions that provide thrust in the backward drive direction to the vessel body 100. When the lever 107 is further tilted rearward, according to the operation amount, the throttle opening degree of the engine increases, and the output of the engine (in detail, the engine speed) increases.

To control the engine of the outboard motor 101, specifically, to control knocking, the arrangements of the above-described preferred embodiments can be applied.

Preferred embodiments of the present invention are described above, and the present invention can also be carried out in still other preferred embodiments. For example, in the above-described preferred embodiments, a water jet propulsion watercraft with only one jet propulsion device and an outboard motor watercraft with two outboard motors are described; however, an arbitrary number of vessel propulsion devices may be provided for one vessel. Specifically, two or more jet propulsion devices may be provided, or one or three or more outboard motors may be provided.

As examples of a vessel propulsion device, a jet propulsion device and outboard motors are described above; however, the present invention is also applicable to a vessel with a vessel propulsion device with another configuration such as an inboard-outdrive engine (stern drive, inboard motor/outboard drive) or an inboard motor.

In the above-described preferred embodiments, an arrangement using the electric throttle device 40 including a throttle valve as an intake amount adjusting unit is shown. However, it is also possible that a variable valve mechanism that can change the opening and closing timings and a lifting amount of the intake valve is used as an intake amount adjusting unit to limit the intake amount.

In the above-described preferred embodiments, on the condition that knocking is detected and the knocking retard amount exceeds the retard amount threshold, the knocking retard amount is integrated. However, the condition that the knocking retard amount exceeds the retard amount threshold may be excluded from the conditions of the knocking retard amount integration.

Further, in the above-described preferred embodiments, whether or not an abnormality has occurred is judged by using the integrated value of the knocking retard amount. However, instead of integration of the knocking retard amount, the number of times for which knocking is detected and the knocking retard amount exceeds the retard amount threshold may be counted. Then, it may be judged that an abnormality has occurred when this count value exceeds a threshold. As in the above-described case, the condition that the knocking retard amount exceeds the retard amount threshold may be excluded from the conditions of counting the number of times.

In the above-described preferred embodiments, the integrated value of the knocking retard amount increases in increments of the unit retard amount. However, it is also possible that the knocking retard amount when the integration conditions (Step S5 of FIG. 4) are satisfied is added to the previous integrated value.

The abnormality judging unit to judge an occurrence of an abnormality may be configured to include a retard amount integrating unit that calculates an integrated value of the knocking retard amount in a period in which knocking is detected (period in which clocking of the timer continues) at intervals within a predetermined time (for example, the integration limit time), and an integrated value comparing unit that compares the integrated value calculated by the retard amount integrating unit with a predetermined integrated value threshold, and judges that an abnormality has occurred when the integrated value exceeds the integrated value threshold.

Further, in the above-described preferred embodiments, an example in which the unit retard amount preferably is the fixed value is shown; however, the unit retard amount may be variably set according to the operation state of the engine, etc.

In the above-described preferred embodiments, as an example in which knocking repeatedly occurs, the case where the fuel having an octane number lower than that of the designated kind of fuel is described; however, even in such a case where an improper alteration relating to the engine has been made, an abnormal state in which knocking cannot be sufficiently reduced or prevented may also be caused depending on the retard control.

In addition, various design changes within the scope of the matters described in the claims may be performed.

Other features of various preferred embodiments of the present invention and modifications thereof extracted from descriptions of this specification and the attached drawings are described below.

An engine system for a vessel propulsion device includes an engine that includes an intake amount adjusting unit configured to adjust an intake amount to be sucked into a cylinder, the engine being configured to generates a drive force for the vessel propulsion device to generate thrust of the vessel; an accelerator operating element configured to be operated by an operator to adjust an output of the engine; an accelerator operation amount detecting unit configured to detect an operation amount of the accelerator operating element; an intake amount characteristic setting unit (function of the engine controller 70, refer to FIG. 7 and FIG. 8) configured to variably set a characteristic of the intake amount with respect to the operation amount of the accelerator operating element; and an intake amount control unit (function of the engine controller 70) configured and programmed to control the intake amount adjusting unit according to an output signal of the accelerator operation amount detecting unit based on the characteristic set by the intake amount characteristic setting unit.

With this arrangement, the intake amount characteristic setting unit is arranged to variably set the characteristic of the intake amount (hereinafter, referred to as "intake amount characteristic") with respect to the operation amount of the accelerator operating element. Accordingly, for example, by setting a proper intake amount characteristic according to the state of the engine, a proper engine operation state is realized, the engine is protected, and the cruising feeling of the vessel is improved. As in the case of the above-described preferred embodiments, the intake amount characteristic may be changed according to judgment of an abnormality. The intake amount characteristic may be changed according to a manual operation of the operator.

In the engine system for a vessel propulsion device according to configured described above, the intake amount characteristic setting unit alternatively sets a plurality of characteristics different in rate of change of the intake amount to the operation amount of the accelerator operating element.

With this arrangement, the plurality of intake amount characteristics set by the intake amount characteristic setting unit are different in rate of change of the intake amount to the operation amount of the accelerator operating element, so that, for example, by setting a proper intake amount characteristic corresponding to the state of the engine, excellent engine output adjusting performance is realized.

In the engine system for a vessel propulsion device according to the configuration described above, the engine system further includes an abnormality judging unit configured to judge that an abnormality has occurred in the engine, wherein the intake amount characteristic setting unit changes the characteristic of the intake amount with respect to an operation amount of the accelerator operating element based on judgment of an abnormality made by the abnormality judging unit.

With this arrangement, when an abnormality is judged, the intake amount characteristic is changed, so that a proper intake amount characteristic according to whether or not an abnormality has occurred is set. Accordingly, the engine is operated in a proper state, so that an excellent cruising feeling is realized while protecting the engine.

The engine system for a vessel propulsion device according to the configuration described above includes an abnormality judging unit configured to judge that an abnormality has occurred in the engine, wherein the intake amount characteristic setting unit makes a change from a first characteristic in which the rate of change of the intake amount with respect to an operation amount of the accelerator operating element is at a first value to a second characteristic in which the rate of change is at a second value smaller than the first value based on judgment of an abnormality made by the abnormality judging unit.

With this arrangement, when an abnormality occurs in the engine, a change to characteristics in which the rate of change of the intake amount is small is made. Specifically, even when the operation amount of the accelerator operating element is large, the change in intake amount is small. Accordingly, the intake amount is prevented from suddenly changing, so that the engine is protected, and the engine output is prevented from suddenly changing and the cruising feeling is improved.

In the engine system for a vessel propulsion device according to the configuration described above, the engine further includes an ignition plug that ignites a gas mixture inside the cylinder, the engine system further including an ignition timing control unit that is configured and programmed to control an ignition timing of the ignition plug, a knocking detecting unit configured to detect an occurrence of knocking in the engine, and a knocking retard control unit configured and programmed to cause the ignition timing control unit to retard the ignition timing of the ignition plug when the knocking detecting unit detects an occurrence of knocking, wherein the abnormality judging unit judges the occurrence of an abnormality in which knocking cannot be reduced or prevented by retarding the ignition timing by the knocking retard control unit, and the intake amount characteristic setting unit changes the characteristic of the intake amount with respect to the operation amount of the accelerator operating element so that a maximum intake amount decreases based on judgment of an abnormality made by the abnormality judging unit.

With this arrangement, when an abnormality occurs in which knocking cannot be reduced or prevented by retarding the ignition timing, the intake amount characteristic is changed to limit the maximum intake amount. Accordingly, knocking is reliably reduced or prevented, so that the engine is protected. In addition, the engine is operated in the state where knocking is reliably reduced or prevented, so that the cruising feeling is improved.

A vessel includes a vessel body, a vessel propulsion device installed in the vessel body, and the engine system for a vessel propulsion device according to the configuration described above, including the engine provided in the vessel propulsion device.

With this arrangement, a vessel improved in cruising feeling is provided.

The present application corresponds to Japanese patent Application No. 2013-165390 filed in the Japan Patent Office on Aug. 8, 2013, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine system for a vessel propulsion device, the engine comprising:
    an engine including an intake amount adjusting unit configured to adjust an intake amount to be sucked into a cylinder and an ignition plug configured to ignite a gas mixture inside the cylinder, the engine being configured to generate a drive force for the vessel propulsion device to generate thrust of a vessel;

an ignition timing control unit configured and programmed to control an ignition timing of the ignition plug;

a knocking detecting unit configured to detect knocking in the engine;

a knocking retard control unit configured and programmed to cause the ignition timing control unit to retard the ignition timing of the ignition plug by a unit retard amount when the knocking detecting unit detects knocking;

an abnormality judging unit configured and programmed to, when a state in which the knocking detecting unit detects knocking at intervals within a predetermined time continues, judge that an abnormality has occurred based on a continued state of knocking detection after a predetermined retard amount threshold is exceeded; and an intake amount limiting unit configured and programmed to limit the intake amount of the engine by controlling the intake amount adjusting unit based on a judgment of an abnormality made by the abnormality judging unit; wherein the predetermined retard amount threshold is an amount greater than the unit retard amount.

2. The engine system for a vessel propulsion device according to claim 1, wherein the intake amount limiting unit is configured and programmed to continue limiting the intake amount of the engine until the engine is stopped after starting the limiting of the intake amount of the engine based on the judgment of an abnormality made by the abnormality judging unit.

3. The engine system for a vessel propulsion device according to claim 1, wherein a normal ignition timing is set to a retard side with respect to a Minimum advance for Best Torque.

4. The engine system for a vessel propulsion device according to claim 1, wherein the intake amount limiting unit is configured and programmed to not perform limiting of the intake amount until the abnormality judging unit judges an abnormality even if the knocking detecting unit detects knocking.

5. The engine system for a vessel propulsion device according to claim 1, wherein the abnormality judging unit includes:

an integrated value operating unit configured and programmed to calculate an integrated value that increases each time the knocking detecting unit detects knocking, and is initialized when the knocking detecting unit detects no knocking for the predetermined time; and an integrated value comparing unit configured and programmed to compare the integrated value calculated by the integrated value operating unit with a predetermined integrated value threshold; and the abnormality judging unit is configured and programmed to judge that an abnormality has occurred when the integrated value exceeds the integrated value threshold.

6. The engine system for a vessel propulsion device according to claim 5, wherein the integrated value operating unit is configured to increase the integrated value on a condition that a knocking retard amount, which is a retard amount applied by the knocking retard control unit, exceeds the predetermined retard amount threshold.

7. The engine system for a vessel propulsion device according to claim 5, wherein the integrated value operating unit is configured to increase the integrated value in increments of the unit retard amount.

8. The engine system for a vessel propulsion device according to claim 1, wherein the abnormality judging unit is configured and programmed to judge that an abnormality has occurred on a condition that a knocking retard amount, which is a retard amount applied by the knocking retard control unit, reaches a knocking retard amount upper limit.

9. The engine system for a vessel propulsion device according to claim 1, wherein the knocking retard control unit is configured and programmed to periodically check the output of the knocking detecting unit with a predetermined detection period, and in each detection period, when the knocking detecting unit detects knocking, the knocking retard control unit retards the ignition timing by the unit retard amount, and when the knocking detecting unit detects no knocking, the knocking retard control unit advances the ignition timing by a unit advance amount.

10. A vessel comprising:

a vessel body;

a vessel propulsion device installed in the vessel body; and the engine system for a vessel propulsion device according to claim 1 that includes the engine provided in the vessel propulsion device.

* * * * *